(12) United States Patent
Bnaya et al.

(10) Patent No.: US 11,738,778 B2
(45) Date of Patent: Aug. 29, 2023

(54) FACILITATING TRANSFERS OF CONTROL BETWEEN A USER AND A VEHICLE CONTROL SYSTEM

(71) Applicant: GM GLOBAL TECHNOLOGY OPERATIONS LLC, Detroit, MI (US)

(72) Inventors: Zahy Bnaya, Tel Aviv (IL); Asaf Degani, Tel Aviv (IL); Claudia Goldman-Shenhar, Mevasseret Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 17/075,996

(22) Filed: Oct. 21, 2020

(65) Prior Publication Data
US 2022/0119015 A1    Apr. 21, 2022

(51) Int. Cl.
*B60W 60/00*    (2020.01)
*B60W 40/08*    (2012.01)
(Continued)

(52) U.S. Cl.
CPC ........ *B60W 60/0053* (2020.02); *B60W 40/08* (2013.01); *B60W 50/08* (2013.01);
(Continued)

(58) Field of Classification Search
None
See application file for complete search history.

(56) References Cited

U.S. PATENT DOCUMENTS 10,935,974 B1 *  3/2021  Fields ................... B60W 50/14
2017/0168689 A1 *  6/2017  Goldman-Shenhar ......................
                                                    G06F 9/453
(Continued)

FOREIGN PATENT DOCUMENTS

WO    WO-2019046204 A1 *  3/2019  ............. B60K 28/02

OTHER PUBLICATIONS

Zhang, Mengxuan, et al. "A finite state machine based automated driving controller and its stochastic optimization." 2017 Dynamic Systems and Control Conference. vol. 58288. American Society of Mechanical Engineers, all. (Year: 2017).*
(Continued)

*Primary Examiner* — James J Lee
*Assistant Examiner* — Tawri M McAndrews
(74) *Attorney, Agent, or Firm* — Cantor Colburn LLP

(57) ABSTRACT

A system for facilitating transfers of control includes an input module configured to acquire a set of user preferences relating control states to contexts, the control states including at least a manual control state, and an autonomous and/or semi-autonomous control state. The system includes a processing device configured to automatically perform, during operation of a semiautonomous system, generating a transfer of control (TOC) policy based on the set of user preferences and a current context state, the TOC policy prescribing transitions between control states in response to actions. The processing device is also configured to perform, based on an action performed by the user or a control system, determining whether to perform a transition from a current control state to a second control state, and in response to the TOC policy prescribing the transition, transitioning from the current control state to the second control state.

18 Claims, 11 Drawing Sheets

| Prob(takeover = User Takes Control Over Automated Driving) | Highway | Night |
|---|---|---|
| 0.3 | True | True |
| 0.8 | True | False |
| 1.0 | False | True |
| 0.6 | False | False |

(51) Int. Cl.
*B60W 50/08* (2020.01)
*B60W 50/14* (2020.01)

(52) U.S. Cl.
CPC .......... *B60W 50/14* (2013.01); *B60W 60/005* (2020.02); *B60W 2540/22* (2013.01)

(56) References Cited

U.S. PATENT DOCUMENTS

| | | | |
|---|---|---|---|
| 2017/0261947 A1* | 9/2017 | Koga | G06N 5/04 |
| 2017/0282930 A1* | 10/2017 | Kochhar | B60W 50/10 |
| 2017/0313323 A1* | 11/2017 | Tseng | B60W 50/0097 |
| 2017/0355377 A1* | 12/2017 | Vijaya Kumar | B60W 50/0098 |
| 2019/0072959 A1* | 3/2019 | Palanisamy | G06N 3/006 |
| 2020/0264608 A1* | 8/2020 | Rosati | G06N 5/045 |
| 2021/0132606 A1* | 5/2021 | Basich | G08G 1/163 |

OTHER PUBLICATIONS

"Markov Chain", Oct. 10, 2020, Wikipedia (historical webpage), https://en.wikipedia.org/w/index.php?title=Markov_chain&oldid=982777778, all. (Year: 2020).*

* cited by examiner

60 ⬎

First stage-Offline (prior to system deployment)

61 — Collect data on users' preferences for interacting with the system

62 — Learn 2 mathematical models:
(1) User cognitive model that predicts users' actions, given the system state & context
(2) User reward model that quantifies the cost incurred to a user when an action is excuted at a system state 63 — Formalize the interaction problem between humans and the automated system as a Markov Decision Process MDP = <C,A,T,R> (for the control states C, set of actions A, transition probabilities T and cost function R)

64 — Solve the MDP resulting in a transfer of control (TOC) policy

↓ TOC policy and user cognitive/reward models

Second stage-Online (system in action after deployment)

65 — Apply TOC policy to determine whether & when user or automated system takes control 66 — Collect data on user interaction with the automated system (the policy)

↓ TOC interaction data

Third stage-Offline (post deployment)

67 — Update user cognitive and reward models

68 — Update TOC policy (recompute it with updated models)

FIG. 3

| Prob(takeover = User Takes Control Over Automated Driving) | Highway | Night |
|---|---|---|
| 0.3 | True | True |
| 0.8 | True | False |
| 1.0 | False | True |
| 0.6 | False | False |

$Pr(C_i, A, C_j)$

| $C_i$ ↓ \ $C_j$ → | C1 | C2 | C3 | C4 | C5 |
|---|---|---|---|---|---|
| C1 | 0 | $Pr(C2(t)|Sj(t))$ | 0 | 0 | 0 |
| C2 | MU | 0 | 0 | MU | 0 |
| C3 | MU | 0 | 0 | 0 | 0 |
| C4 | MU | 0 | MU | 0 | $Pr(C5(t)|Sj(t))$ |
| C5 | 1 | 0 | 0 | 0 | 0 |

| $C_i$ ↓ \ $C_j$ → | C1 | C2 | C3 | C4 | C5 |
|---|---|---|---|---|---|
| C1 | 0 | $Pr(C2(t)|Sj(t))$ | 0 | 0 | 0 |
| C2 | MU | 0 | 0 | MU | 0 |
| C3 | MU | 0 | 0 | 0 | 0 |
| C4 | MU | 0 | MU | 0 | $Pr(C5(t)|Sj(t))$ |
| C5 | 1 | 0 | 0 | 0 | 0 |

FIG. 7

| Prob(takeover) | H | N |
|---|---|---|
| 0.9 | T | T |
| 0.8 | T | F |
| 0.1 | F | T |
| 0.6 | F | F |

120

R(Ci,A,Cj)

| Ci \ Cj → | C1 | C2 | C3 | C4 | C5 |
|---|---|---|---|---|---|
| C1 | n/a | -1 | n/a | n/a | n/a |
| C2 | +5 | n/a | n/a | +1 | n/a |
| C3 | +3 | n/a | n/a | n/a | n/a |
| C4 | +5 | n/a | +4 | n/a | -2 |
| C5 | +1 | n/a | n/a | n/a | n/a |

| Prob(takeover) | H | N |
|---|---|---|
| 0.9 | T | T |
| 0.8 | T | F |
| 0.1 | F | T |
| 0.6 | F | F |

$R(C_i, A, C_j)$

142

| $C_i$ \ $C_j \rightarrow$ | C1 | C2 | C3 | C4 | C5 |
|---|---|---|---|---|---|
| C1 | n/a | -1 | n/a | n/a | n/a |
| C2 | +1 | n/a | n/a | +1 | n/a |
| C3 | +3 | n/a | n/a | n/a | n/a |
| C4 | +4 | n/a | +3 | n/a | -2 |
| C5 | +1 | n/a | n/a | n/a | n/a |

| Prob(takeover) | H | N |
|---|---|---|
| 0.1 | T | T |
| 0.7 | T | F |
| 0.1 | F | T |
| 0.9 | F | F |

$R(C_i, A, C_j)$

152

| $C_i$ \ $C_j \rightarrow$ | C1 | C2 | C3 | C4 | C5 |
|---|---|---|---|---|---|
| C1 | 0 | -3 | 0 | 0 | 0 |
| C2 | +3 | 0 | 0 | +7 | 0 |
| C3 | +1 | 0 | 0 | 0 | 0 |
| C4 | +1 | 0 | +0.5 | 0 | -12 |
| C5 | +1 | 0 | 0 | 0 | 0 |

| Ci \ Cj→ | C1 | C2 | C3 | C4 | C5 |
|---|---|---|---|---|---|
| C1 | n/a | -1 | n/a | n/a | n/a |
| C2 | +5 | n/a | n/a | +1 | n/a |
| C3 | +3 | n/a | n/a | n/a | n/a |
| C4 | +5 | n/a | +4 | n/a | -2 |
| C5 | +1 | n/a | n/a | n/a | n/a |

| Ci \ Cj→ | C1 | C2 | C3 | C4 | C5 |
|---|---|---|---|---|---|
| C1 | 0 | -3 | 0 | 0 | 0 |
| C2 | +2 | 0 | 0 | +17 | 0 |
| C3 | +1 | 0 | 0 | 0 | 0 |
| C4 | +1 | 0 | +0.5 | 0 | -12 |
| C5 | +1 | 0 | 0 | 0 | 0 |

FIG. 15 ated with manual control state, and at least one of an autonomous or semi-autonomous control state.

FACILITATING TRANSFERS OF CONTROL BETWEEN A USER AND A VEHICLE CONTROL SYSTEM

INTRODUCTION

The subject disclosure relates to transfers of control in a vehicle.

Autonomous and semi-autonomous control systems are becoming more and more prevalent. Such control systems may be provided for various applications, such as automobiles, trucks, construction equipment, software tools, manufacturing equipment, robotics, farm equipment, personal mobility devices (e.g., electric wheelchairs) and others. For example, in semi-autonomous vehicles, a user (driver) can typically switch between manual control and semi-autonomous control by interacting with vehicle systems, for example, by selecting a touchscreen option or button. Such interactions can cause the user's attention to be diverted. Accordingly, it is desirable to provide a system that can facilitate transfer of control between a user and a vehicle control system while reducing or minimizing contemporaneous active user interactions.

SUMMARY

In one exemplary embodiment, a system for facilitating transfers of control among a user and a control system includes an input module configured to acquire a set of user preferences, the set of user preferences relating control states to contexts, the control states including at least a manual control state, and at least one of an autonomous control state and a semi-autonomous control state. The system also includes a processing device configured to automatically perform, during operation of a semi-autonomous system, generating a transfer of control (TOC) policy based on the set of user preferences and a current context state, the TOC policy prescribing transitions between control states in response to actions performed during the operation. The processing device is also configured to perform, based on an action performed by the user or the control system, determining based on the TOC policy whether to perform a transition from a current control state to a second control state, and in response to the TOC policy prescribing the transition, transitioning from the current control state to the second control state.

In addition to one or more of the features described herein, the processing device is configured to generate a user model based on the set of user preferences, the user model configured to predict a user action when the control system is operating in the current context state.

In addition to one or more of the features described herein, the user model indicates a probability of transitioning to a control state when the control system is operating in a given context state.

In addition to one or more of the features described herein, the TOC policy is generated according to a Markov decision process (MDP).

In addition to one or more of the features described herein, the processing device is further configured to perform, based on the set of user preferences, estimating at least one of a cognitive load and a sensory load on the user when interacting with the control system.

In addition to one or more of the features described herein, generating the TOC policy includes calculating a reward function associated with a notification presented by the control system, the reward function based on the cognitive load and/or the sensory load, the processing device configured to present the notification to the user in response to a value of the reward function exceeding a selected value.

In addition to one or more of the features described herein, the processing device is further configured to acquire interaction data representing interactions between the user and the control system during the operation, determine one or more updates to the user preferences based on the interaction data, and update the user model based on the updated preferences.

In one exemplary embodiment, a method of facilitating transfers of control among a user and a control system includes acquiring a set of user preferences, the set of user preferences relating control states to contexts, the control states including at least a manual control state, and at least one of an autonomous or semi-autonomous control state. The method also includes automatically, during operation of a semi-autonomous system, generating a transfer of control (TOC) policy based on the set of user preferences and a current context state, the TOC policy prescribing transitions between control states in response to actions performed during the operation. The method further includes, based on an action performed by the user or the control system, determining based on the TOC policy whether to perform a transition from a current control state to a second control state, and in response to the TOC policy prescribing the transition, transitioning from the current control state to the second control state.

In addition to one or more of the features described herein, the method further comprises generating a user model based on the set of user preferences, the user model configured to predict a user action when the control system is operating in the current context state.

In addition to one or more of the features described herein, the user model indicates a probability of transitioning to a control state when the control system is operating in a given context state.

In addition to one or more of the features described herein, the TOC policy is generated according to a Markov decision process (MDP).

In addition to one or more of the features described herein, the method further comprises, based on the set of user preferences, estimating at least one of a cognitive load and a sensory load on the user when interacting with the control system.

In addition to one or more of the features described herein, generating the TOC policy includes calculating a reward function associated with a notification presented by the control system, the reward function based on the cognitive load and/or the sensory load.

In addition to one or more of the features described herein, the method further comprises acquiring interaction data representing interactions between the user and the control system during the operation, determining one or more updates to the user preferences based on the interaction data, and updating the user model based on the updated preferences.

In one exemplary embodiment, a vehicle control system includes a memory having computer readable instructions, and a processing device for executing the computer readable instructions, the computer readable instructions controlling the processing device to perform acquiring a set of user preferences, the set of user preferences relating control states to vehicle contexts, the control states including at least a manual control state, and at least one of an autonomous or semi-autonomous control state. The processing device is also configured to perform, automatically and during operation of a vehicle by a user, generating a transfer of control (TOC) policy based on the set of user preferences and a current context state, the TOC policy prescribing transitions between control states in response to actions performed during the vehicle operation. The processing device is further configured to perform, based on an action performed by the user or a vehicle control system, determining based on the TOC policy whether to perform a transition from a current control state to a second control state, in response to the TOC policy prescribing the transition, transitioning from the current control state to the second control state.

In addition to one or more of the features described herein, the processing device is further configured to perform generating a user model based on the set of user preferences, the user model configured to predict a user action when the vehicle is in the current context state.

In addition to one or more of the features described herein, the user model indicates a probability of transitioning to a control state when the vehicle is in a given context state.

In addition to one or more of the features described herein, the TOC policy is generated according to a Markov decision process (MDP).

In addition to one or more of the features described herein, the processing device is further configured to perform, based on the set of user preferences, estimating at least one of a cognitive load and a sensory load on a user when interacting with the vehicle control system.

In addition to one or more of the features described herein, generating the TOC policy includes calculating a reward function associated with a notification presented by the vehicle control system, the reward function based on the cognitive load and/or the sensory load.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a flowchart depicting aspects of a method of generating a transfer of control (TOC) policy, controlling transfers of control among a user and a vehicle control system, and/or updating the TOC policy, in accordance with an exemplary embodiment;

FIG. 6 depicts an example of a representation of a transition function generated according to a TOC policy, the transition function prescribing transfers of control between control states based on vehicle context and user preferences, in accordance with an exemplary embodiment;

FIG. 7 depicts an example of a reward function generated according to the TOC policy of FIG. 6, in accordance with an exemplary embodiment;

FIG. 10 depicts an example of a user model and a reward function generated via the method of FIG. 9, in accordance with an exemplary embodiment;

FIG. 12 depicts an example of a method of controlling vehicle control states for a first user, and notifying the first user of a change in control state based on a reward function, in accordance with an exemplary embodiment;

FIG. 13 depicts an example of a method of controlling vehicle control states for a second user, and notifying the second user of a change in control state based on a reward function, in accordance with an exemplary embodiment;

FIG. 14 depicts an example of a method of controlling vehicle control states for a first user, and notifying the first user of a change in control state based on a reward function, in accordance with an exemplary embodiment; and FIG. 15 depicts an example of a method of controlling vehicle control states for a second user, and notifying the second user of a change in control state based on a reward function, in accordance with an exemplary embodiment.

DETAILED DESCRIPTION

Figure 1:
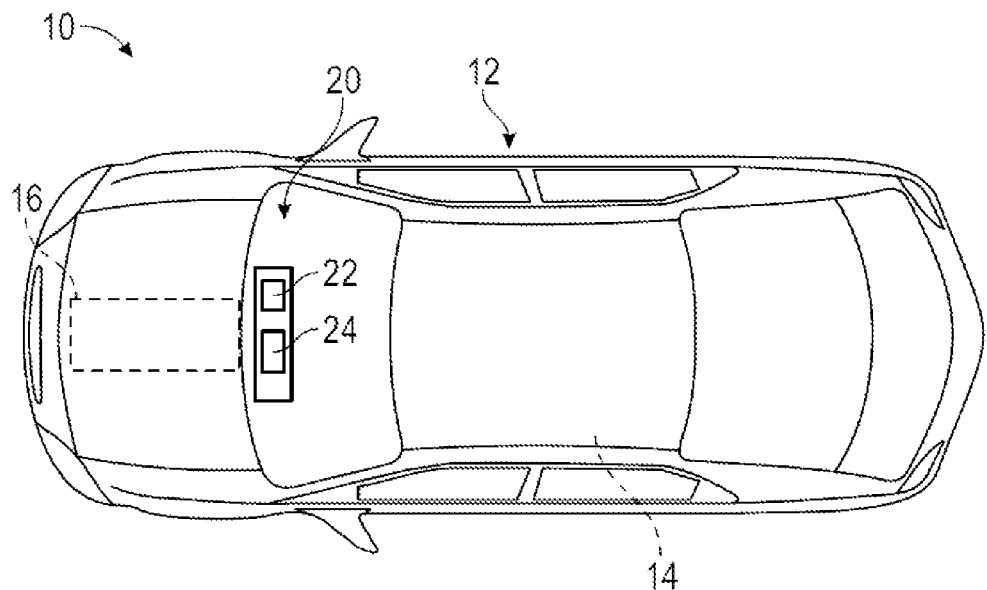
FIG. 1 is a top view of a motor vehicle including a vehicle processing device, in accordance with an exemplary embodiment.

The following description is merely exemplary in nature and is not intended to limit the present disclosure, its application or uses. It should be understood that throughout the drawings, corresponding reference numerals indicate like or corresponding parts and features.

Devices, systems and methods are provided for facilitating transfers of control between a user and a control system of a semi-autonomous system (SAS). An SAS may be any type of system that includes both autonomous and manual control capability. In one embodiment, the SAS is an autonomous or semi-autonomous vehicle control system. The vehicle may be any type of vehicle (e.g., passenger car, truck, aircraft) that has some level of autonomous control capability. The SAS is not so limited and can be any type of semi-autonomous system.

An embodiment of an SAS includes or is in communication with a processing device configured to formulate a transfer of control policy that prescribes when and if control of the SAS is transferred between different control states. The transfer of control policy may be generated during operation of an SAS using a decision process that accounts for user preferences, SAS control system capabilities, the context in which the SAS is operating, and/or the cost of transferring control (e.g., the cognitive burden on the user to interact with the SAS).

The processing device uses the transfer of control policy to compute an optimal execution of control transfers (the temporal sequence of control transition events) between the user and the SAS control system for a given protocol of transfer of control (as prescribed by the TOC policy). In this way, transfer of control decisions may be made during operation and based on the current SAS and user context, in order to relieve the burden on the user to make such decisions during operation.

Transfer of control decisions may include decisions to automatically transfer control from a current control state to a prescribed control state. In one embodiment, prior to or concurrent with a transfer of control, the processing device provides an alert to the user. The alert may be a notification to the user that a transfer of control is occurring or pending. In one embodiment, the processing device, as part of the alert, provides the user with an option to accept or reject the prescribed transfer of control.

In one embodiment, the TOC policy is generated using a formulation of a transfer of control problem as a decision process. The decision process may be any type of process capable of generating a TOC policy based on user preferences, and user and SAS context. In one embodiment, the decision process is a Markov decision process. The Markov decision process is used to calculate a TOC policy based on user preferences with respect to who has control (SAS control system or user), capabilities of control by the SAS control system, user and SAS context, and overhead costs when transitioning between different states of control. A reward function may be provided as an input to the Markov decision process (or other suitable decision process), in order to increase or maximize user satisfaction. The TOC policy is generated such that the TOC policy maximizes a given reward function, to attain a sufficiently high level of user satisfaction. The TOC policy, in one embodiment, prescribes a type of notification provided to the user to alert the user to a transfer of control, which is selected based on the cost to the user (e.g., cognitive load and/or sensory load).

It is noted that the user preferences can be acquired based on information provided by a specific user, and/or from a class of people having a common or similar characteristic (e.g., age). In addition, user preferences can be acquired by monitoring driver inputs during vehicle operation.

In one embodiment, the processing device is configured to create a user model based on user preferences. The user model predicts the control preference of the user under various contexts, and allows the processing device to predict how and when control may be transferred, and make control decisions therefrom. The user model may be based on user preferences entered by a user, on user preferences from a class of users, and/or by monitoring user interactions with the SAS control system.

The system may be configured to perform updates to a TOC policy and/or a user model based on monitoring data collected during operation. The monitoring data includes detection of user inputs, SAS control states and/or a user condition (e.g., distracted, alert, etc.), which can be used to update the model(s) and improve transfer of control decisions.

Embodiments described herein provide a number of advantages. For example, the embodiments provide for automatic transfer of control decisions that reduce or minimize user interaction with a vehicle or other SAS control systems and reduce the possibility of overly distracting the user. In addition, the system weighs the cognitive load on the user when deciding whether to transfer control, according to the user preferences, to ensure that a benefit of transferring control outweighs any costs. Interaction over control of the system (which side is in control, when and how) carry costs which can be optimized either by an optimized negotiation policy or by a design of a better protocol.

FIG. 1 shows an embodiment of a motor vehicle 10, which includes a vehicle body 12 defining, at least in part, an occupant compartment 14. The vehicle body 12 also supports various vehicle subsystems including an engine system 16, and other subsystems to support functions of the engine system 16 and other vehicle components, such as a braking subsystem, a steering subsystem, a fuel injection subsystem, an exhaust subsystem and others.

The vehicle 10 also includes an on-board computer system 20 that includes one or more processing devices 22 and a user interface 24. The user interface 24 may include a touchscreen, a speech recognition system and/or various buttons for allowing a user to interact with features of the vehicle. The user interface 24 may be configured to interact with the user via visual communications (e.g., text and/or graphical displays), tactile communications or alerts (e.g., vibration), and/or audible communications.

The on-board computer system 20 may be configured as, or include capability for, autonomous vehicle control. The on-board computer system 20 or components of the system 20 that have autonomous control function is/are referred to as a "vehicle control system."

Figure 2:
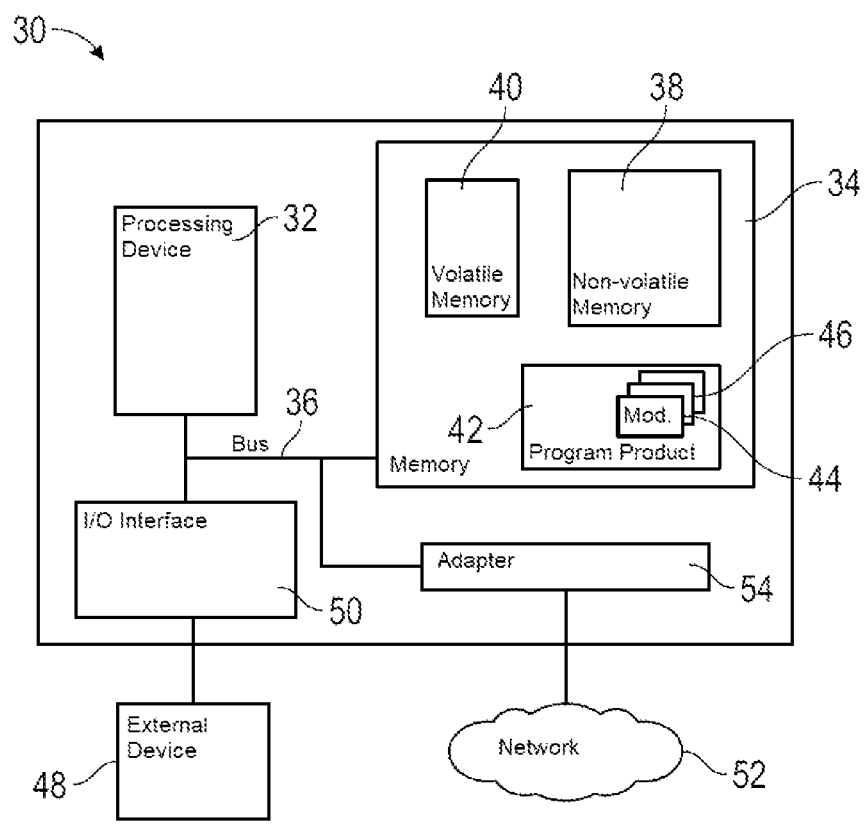
FIG. 2 depicts a computer system configured to perform operations related to transfers of control, in accordance with an exemplary embodiment.

FIG. 2 illustrates aspects of an embodiment of a computer system 30 that is in communication with, or is part of, the on-board computer system 20, and that can perform various aspects of embodiments described herein. The computer system 30 includes at least one processing device 32, which generally includes one or more processors for performing aspects of methods described herein. The computer system 30 may be part of, or in communication with a semi-autonomous system (SAS). In the following the SAS is described as part of the vehicle 10; however, the SAS can be any system that has some level of autonomous control (e.g., manufacturing equipment, personal mobility devices, construction equipment, etc.).

The processing device 32 can be integrated into the vehicle 10, for example, as an on-board processing device 22, or can be a processing device separate from the vehicle 10, such as a server, a personal computer or a mobile device (e.g., a smartphone or tablet). The processing device 32 may be configured to perform functions that include collecting user preference data, generating transfer of control policies and/or control of various vehicle subsystems (e.g., as part of an autonomous or semi-autonomous vehicle control system).

Components of the computer system 30 include the processing device 32 (such as one or more processors or processing units), a system memory 34, and a bus 36 that couples various system components including the system memory 34 to the processing device 32. The system memory 34 may include a variety of computer system readable media. Such media can be any available media that is accessible by the processing device 32, and includes both volatile and non-volatile media, removable and non-removable media.

For example, the system memory 34 includes a non-volatile memory 38 such as a hard drive, and may also include a volatile memory 40, such as random access memory (RAM) and/or cache memory. The computer system 30 can further include other removable/non-removable, volatile/non-volatile computer system storage media.

The system memory 34 can include at least one program product 42 having a set (e.g., at least one) of program modules that are configured to carry out functions of the embodiments described herein. For example, the system memory 34 stores various program modules that generally carry out the functions and/or methodologies of embodiments described herein. An input module 44 may be included to perform functions related to acquiring data including user preference data, vehicle context and control state data, and monitoring data (e.g., vehicle monitoring data and user interaction data). A processing module 46 may be included to perform functions related to generating TOC policies, constructing models, performing transfers of control and/or updating TOC policies and models. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 48, such as vehicle components and various control units, such as a vehicle control system. Communication with various devices can occur via Input/Output (I/O) interfaces 50.

The processing device 32 may also communicate with one or more networks 52 such as a local area network (LAN), a general wide area network (WAN), and/or a public network (e.g., the Internet) via a network adapter 54. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

The on-board computer system 20, the computer system 30, and/or other processing device is configured to, during vehicle operation, perform transfers of control between control states (e.g., from a vehicle control system to a user, from the user to the vehicle control system, between control transition states, and/or between levels of autonomous control). The transfers of control may be based on a transfer of control (TOC) policy that is generated based on user preferences and capabilities of the vehicle control system (e.g., levels of autonomous operation). The TOC policy is provided to improve or optimize the timing of transfers of control with respect to user preferences, control capabilities of the vehicle control system, and costs of transferring control under various conditions and contexts. The policy may also provide the optimal timing to notify a user when a transfer of control is required or recommended, and/or when it is optimal for the vehicle control to take control. The control policy allows the processing device to transfer control (or provide the user an option to take control) without requiring contemporaneous active user interaction with the control system.

The user preferences may be based on pre-existing user information (e.g., provided by the user prior to vehicle operation), and/or based on user preferences determined by monitoring user inputs during operation. Other sources of information that can be used for determining user preferences include an analysis of previous transfer of control actions, and an analysis of control actions and/or preferences for a group or class of users having a common characteristic.

In one embodiment, user preferences are incorporated into a user model, which describes preferred control states under various contexts. The user model may be a probabilistic model that provides probability values indicative of the probability that a user would prefer a given control action (a change between control states) given a certain context.

In one embodiment, the TOC policy is generated by using an automated decision algorithm or process, which prescribes transfer of control actions based on user preferences, contexts and control states. The decision process generates a TOC policy based on user preferences with respect to the user's preferred control state in a given context (e.g., urban or rural, night or day), capabilities of control by the vehicle control system (available control states such as full autonomous control or semi-autonomous control), and overhead costs when transitioning between different states of control.

The decision process may be a stochastic and/or probabilistic process such as a Markov decision process. Although the decision process described below is a Markov decision process, any other suitable algorithm, model or process may be used, such as optimal control, dynamic programming, machine learning (supervised or unsupervised) and others.

A Markov decision process (MDP) is a discrete-time stochastic control process, which provides a mathematical framework for modeling decision making under conditions in which outcomes are partly random and partly under the control of a decision maker (the vehicle system).

An embodiment of the MDP process is defined by the tuple $<C, A, T, \tilde{R}, \tilde{S}>$. In the tuple, C is a set of control states, where each control state defines a vehicle state related to which entity (the user or the vehicle control system) controls aspects of vehicle operation. Examples of control states include full user control, full autonomous control, semi-autonomous control, and autonomous control of specific vehicle functions (e.g., braking or steering).

A is a set of predefined actions, which may be performed by the user or the vehicle control system. The actions may be represented as $A(A_u, A_m)$, where $A_u$ is a set of predefined user actions, and $A_m$ is a set of vehicle control system (machine) actions. The predefined actions are applied to states of the control. Examples of actions include taking control by the user, taking control by the vehicle control system, acknowledging or ignoring a communication from the vehicle control system, detecting user inputs, and performing control actions by the user (e.g., applying brakes, engaging a steering system, and others).

T is a probabilistic transition function of switching from a current control state to another control state given an action A. This function provides a probability that a control action A will lead to a change in the control state. $\tilde{R}$ is a reward function that represents a value that the user experiences when the vehicle control system performs an action to change control state, and/or when the vehicle control system presents a notification to the user. The reward function considers the "cost" of interaction between user and the vehicle control system (e.g., the cognitive load (how much the user must devote attention to the system) and the sensory load (extent of sensory input needed)). The reward function prescribes the type of notification that minimizes cognitive and sensory load, and/or that aligns with the user's preferences.

$\tilde{S}$ is a set of context states describing the relevant context of the vehicle and the vehicle control system. A "context state" is any state or condition that the vehicle is in, which can affect transfer of control decisions. Context states may relate to vehicle capabilities, user conditions (e.g., is the user distracted) and/or environmental conditions. Examples of context states include time of day (e.g., day or night), regional characteristics (e.g., urban, rural), road type (e.g., highway, local road), road condition (e.g., paved or dirt) and others. Other context states include capabilities of the vehicle control system (e.g., autonomous, semi-autonomous, maneuvers such as parking and turning actions that can be performed by the vehicle control system).

Each context state in $\tilde{S}$ includes information from various sources. One source is a subset of the features available to the vehicle control system (environmental information, detections, system status notifications, etc.) that are relevant for the transfer of control. Another source is information about a user condition (attention, engagement, focus, health, stress, etc.) that affects the desired state of control. The user condition information may be acquired by monitoring the user via a camera or other sensor, and analyzing the information using facial recognition and/or biometric data, for example. At any time point t, the system is at a certain state of control $c_t$ and has a certain context $\tilde{s}_t$.

A processing device utilizes the decision process to generate a TOC policy during vehicle operation that prescribes how control decisions are made, based on the context state, control state and user preferences.

FIG. 3 illustrates embodiments of a method 60 of monitoring a vehicle during operation, generating a TOC policy, and facilitating transfers of control between a user and a vehicle control system. The method 60 may be performed by a processor or processors disposed in a vehicle (e.g., as an on-board computer such as the computer system 20), referred to herein as a "processing device". The method 60 is discussed in conjunction with blocks 61-68. The method 60 is not limited to the number or order of steps therein, as some steps represented by blocks 61-68 may be performed in a different order than that described below, or fewer than all of the steps may be performed.

The method 60 is discussed in conjunction with the vehicle of FIG. 1 and a processing device, which may be, for example, the computer system 30, the on-board processor 22, or a combination thereof. It is noted that aspects of the method 60 may be performed by any suitable processing device or system, or combination of processing devices.

The method 60 includes three constituent stages, including a first stage performed prior to deployment (e.g., prior to vehicle operation or prior to the onset of a process of generating a TOC policy), a second stage for using a TOC policy to make control decisions, and a third stage performed after deployment for updating user models and the TOC policy. The first stage is represented by blocks 61-64, the second stage is represented by blocks 65 and 66, and the third stage is represented by blocks 67 and 68.

The method 60 is described in conjunction with a vehicle that has a semi-autonomous control system (SAS), and is referred to as an "SAS system." It is noted that the method is not so limited, as the method may be performed in vehicles that are capable of various levels of control. Examples of levels of control include full manual control by a user, partial user control (e.g., steering is manual, and acceleration and braking is controlled by a vehicle control system), and full autonomous control.

At block 61, the processing device collects data on user preferences regarding interaction with the vehicle system. The user preferences indicate the user's preference regarding the control state that is preferred in various contexts. For example, a user preference may be to manually control the vehicle at night but permit autonomous control during daylight hours.

For example, a user can be provided with a questionnaire or other document or display that prompts the user to provide preferences regarding conditions or context in which the user would prefer a state of control. For example, a user can provide affirmative or negative responses to preference statements or questions, manually enter preference statements, or select pre-defined statements. Examples of statements include:
"I prefer driving manually over being engaged"
"I prefer to be engaged during nights when I drive on a highway"

In one embodiment, the user can provide a numerical ranking or other indication as to how much the user prefers a state of control is a given context or set of contexts. This indication can be used to calculate probabilities that a user would select a control state.

At block 62, user models may be generated for use in a decision process and creating TOC policies. A user cognitive model is generated for prediction of user actions, based on user preferences, the current control state and context. This information is used to construct a user model that relates user control preferences in each of one or more contexts or combination of context. The user model may be represented by a Bayesian network, a neural network, a look-up table, and/or any other data structure or representation that specifies user control preferences under various contexts.

The cognitive model can be represented by the following probability function U, which describes a TOC policy that the user is expected to take regarding a control negotiation.

$$U:P(\tilde{A}_U/\tilde{S},C),$$

where P is a probability that a user will take an action $A_U$ given a control state C and a context state $\tilde{S}$.

Figures 4, 5:
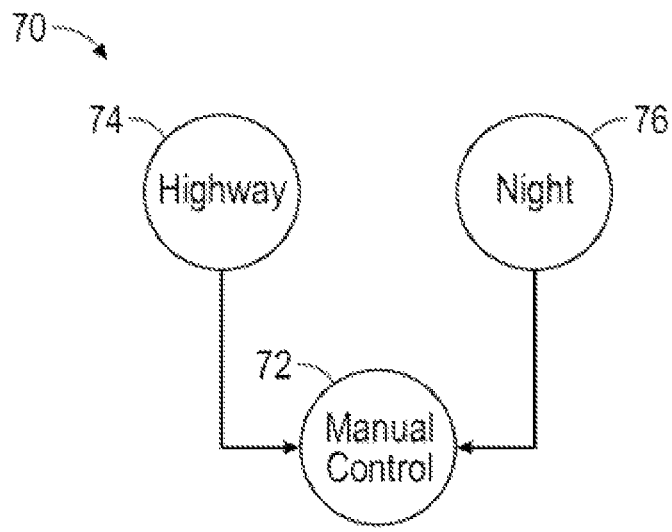
FIG. 4 depicts an example of a user model, the user model based on user preferences that relate vehicle contexts to preferred control states, in accordance with an exemplary embodiment.
FIG. 5 depicts an example of a probabilistic user model, the probabilistic user model based on user preferences that relate vehicle contexts to preferred control states, in accordance with an exemplary embodiment.

FIG. 4 shows an example of a portion of a user model 70 configured as a Bayesian network, which graphically represents the dependencies of control states to context states. The user model 70 includes a node 72 representing a manual control state, and nodes 74 and 76 represent context values (i.e., highway context and a night context, respectively). This model 70 predicts that a user will opt for manual control when on a highway at night.

Another example of a user model is shown in FIG. 5. The user model in this example is represented by a look-up table (LUT) 78 that relates the probability that a user would enter a manual control state from an automated control state (i.e., take control from the vehicle control system), according to user preferences, under various context values. The probability in this example is denoted "Prob(takeover)," and is a probability of the control state entering a manual control state (the user is in control of driving) given the context state "highway" ("H") and "night" ("N"). The context state "H" is true ("T") if a vehicle is on a highway, and false ("F") is a vehicle is not on a highway. The context state "N" is true if the vehicle is operating at night, and false if the vehicle is not operating at night.

The LUT 78 is a conditional probability table that shows the probability of the user taking control under road and time of day conditions. This example represents a user who prefers to drive manually at night (regardless of the road condition), prefers to drive manually on highways during daylight hours, and prefers autonomous control on highways at night.

In addition, a reward model may be generated that quantifies the cost incurred to a user when an action is performed at a system state. The reward model represents the value (a notification such as a blinking light or other visual indicator, a series of beeps or other audible indicator, a graphical notification, a textual notification, etc.) that a user receives when the system moves between control states.

Referring again to FIG. 3, at block 63, a TOC policy is created by formalizing the interaction problem as a suitable decision process. In one embodiment, the decision process is a Markov decision process (MDP).

At block 64, the MDP problem is solved to generate a TOC policy.

At block 65, the second stage commences during operation of the vehicle. The TOC policy is applied based on a detected control state and one or more detected context states. The TOC policy prescribes under what conditions and when the user or the vehicle control system takes control.

At block 66, during operation of the vehicle, data related to user interactions with the vehicle control system is collected, which can be used to validate and/or improve the TOC policy, the MDP process and/or the user models (e.g., the cognitive model and/or reward model).

At blocks 67 and 68, the third stage commences, in which the user models and TOC policy are evaluated. For example, at block 67, the user cognitive and/or reward model may be updated based on detecting user reaction to notifications from the processing device, monitoring user inputs in various contexts, and otherwise collecting data indicative of user behavior with respect to transfers of control. At block 68, the TOC policy is updated (e.g., by recalculating the TOC policy based on updated user models (if desired)).

The following is an example of an architecture for computing a TOC policy using a MDP process. In this example, the MDP process is represented by the tuple:

$$\text{TOC MDP} = <C, A, T, \tilde{R}, \tilde{S}>.$$

In this example, the set of states C includes five control states, denoted as states C1, C2, C3, C4 and C5. Control state C1 is a full manual driving state, C2 is a state in which the vehicle control system requests control, and C3 is partial manual driving state, in which one or more control features (e.g., steering) is manually controlled, and one or more other control features (e.g., acceleration and/or brakes) are controlled by the vehicle control system. Control state C4 is an automated driving state, and control state C5 is a HandOver to driver state.

The set of actions A includes a set of actions that can be executed by the either the user ($A_U$) or the machine ($A_M$). In this example, the set of user actions includes the following:

$A_U$={User ignores control request, User agrees to give control, User takes control, User brakes}

$A_M$={Vehicle requests control, countdown, handover, wait-for-user-input}

T is the transition function, which provides the probability of moving from a first state $C_i$ to a second state $C_j$. $\tilde{R}$ is the notification the user receives according to the reward function when the system moves between state Ci to state Cj while performing an action from $A_m$.

FIG. 6 depicts an example of a LUT 90 representing a transition function and TOC policy. The LUT 90 is calculated based on a user model, such as the model 70. As shown, the LUT 90 provides a probability Pr(Ci, Cj) of a transition from a first state Ci to a second state Cj. "Model U" ("MU") refers to a user model such as the model 70, which provides probability values corresponding to the probability that a user would choose a certain control state given a set of context states.

FIG. 7 depicts an example of a LUT 92 representing a reward function R(Ci,A,Cj) that prescribes a reward value (an indication or notification) used to notify the user of a transfer of control. The reward function, in one embodiment is dependent on the cost to the user to interact with the vehicle control system (e.g., cognitive load, sensory load), as well as how much the user prefers to be in a given control state under a set of context states.

The reward function may be based on user preferences acquired from a user (e.g., from questionnaires) or assumed based on knowledge of preferences of a group or class of people (e.g., how much people like to get a red blinking button).

For example, a user may indicate that blinking lights are undesirable, (e.g., the user enters or agrees with the statement that "blinking disturbs me in general but when I am driving at nights and tired, I would prefer to be engaged in automated driving when I need to drive on a highway").

Figure 8:
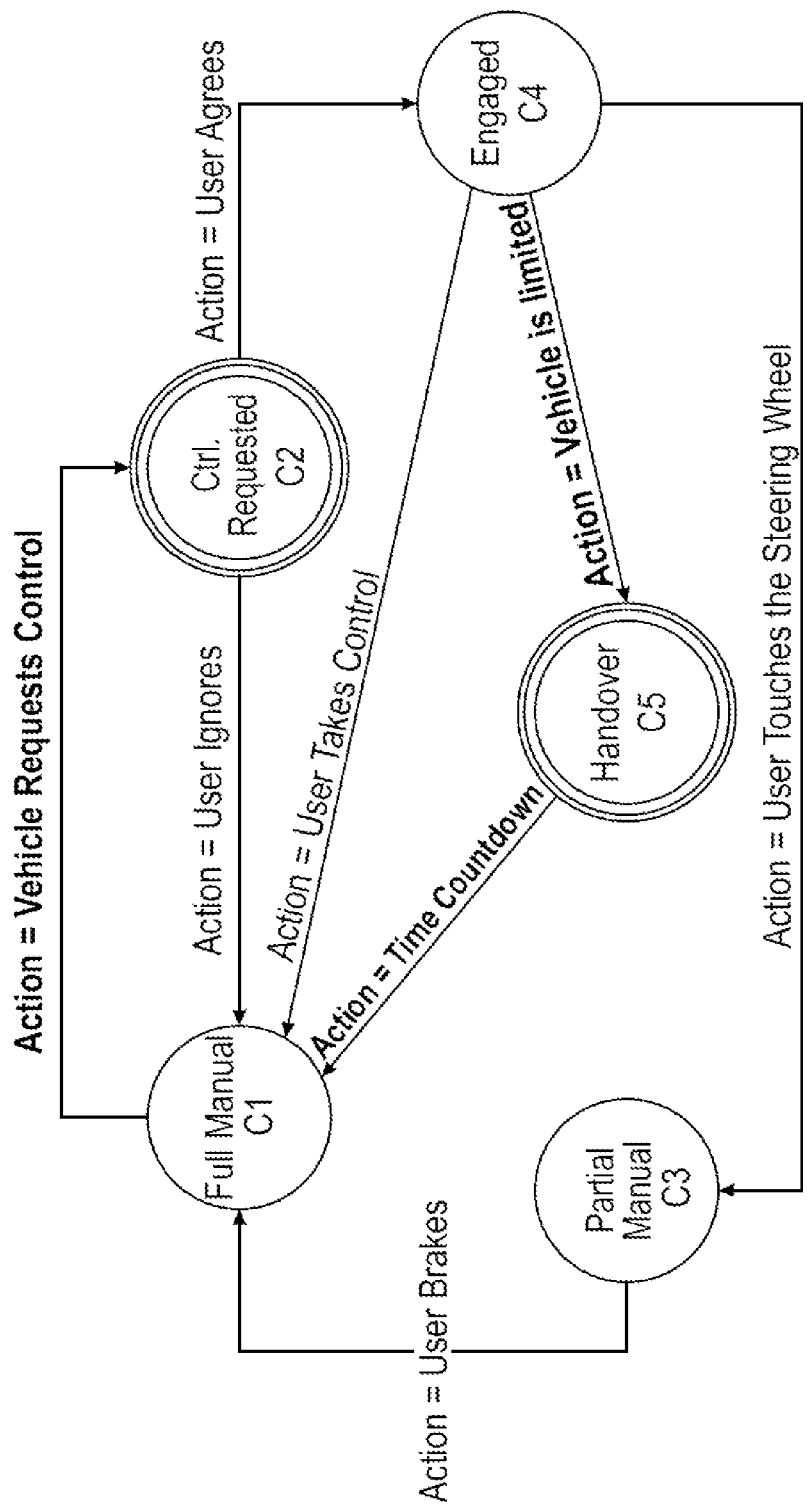
FIG. 8 is a graphical representation of a decision process framework configured to be used to generate a TOC policy.

FIG. 8 is graphical representation of an MDP decision framework representing an MDP process, generated according to the examples of FIGS. 6 and 7. The framework graphically represents the various control states, and shows actions (Au or Am) that can lead to a transfer of control. Although not shown, the MDP may include determining a probability that an action will result in the control state transition. In this example, from full manual control (control state C1), the action of the vehicle requesting control may transition the control state to state C2. The action of the user agreeing with the request (input by the driver (via, e.g., pushing a button, providing a verbal instruction)) may cause a transition from state C2 to state C4 (automated driving engaged). If the action is that the user ignores the request (no input by the driver), the MDP may transition back to state C1.

From the automated driving state (C4), the action of the user touching or moving the steering wheel can cause a transition to state C3 (partial manual). The action of the user applying brakes can cause a transition from state C3 to state C1. Another action is an indication that the vehicle is limited, which may cause a transition from control state C4 to a HandOver state (C5), in which the vehicle is in the process of handing over full control to the user. A vehicle may be limited if there is a condition in which full functionality is or may be compromised, or a condition in which autonomous control cannot be implemented properly. For example, the vehicle may be limited in its capacity to perform autonomously if a sensor is compromised (e.g., a camera lens is obstructed) or if road conditions are beyond autonomous capability (e.g., the vehicle cannot autonomously perform a roundabout or other maneuver).

If a time period passes without a change in condition (this is considered an action), the vehicle control system may transition to state C1. The probability that the change will take place as the result of an action is defined by the user model.

Figure 9:
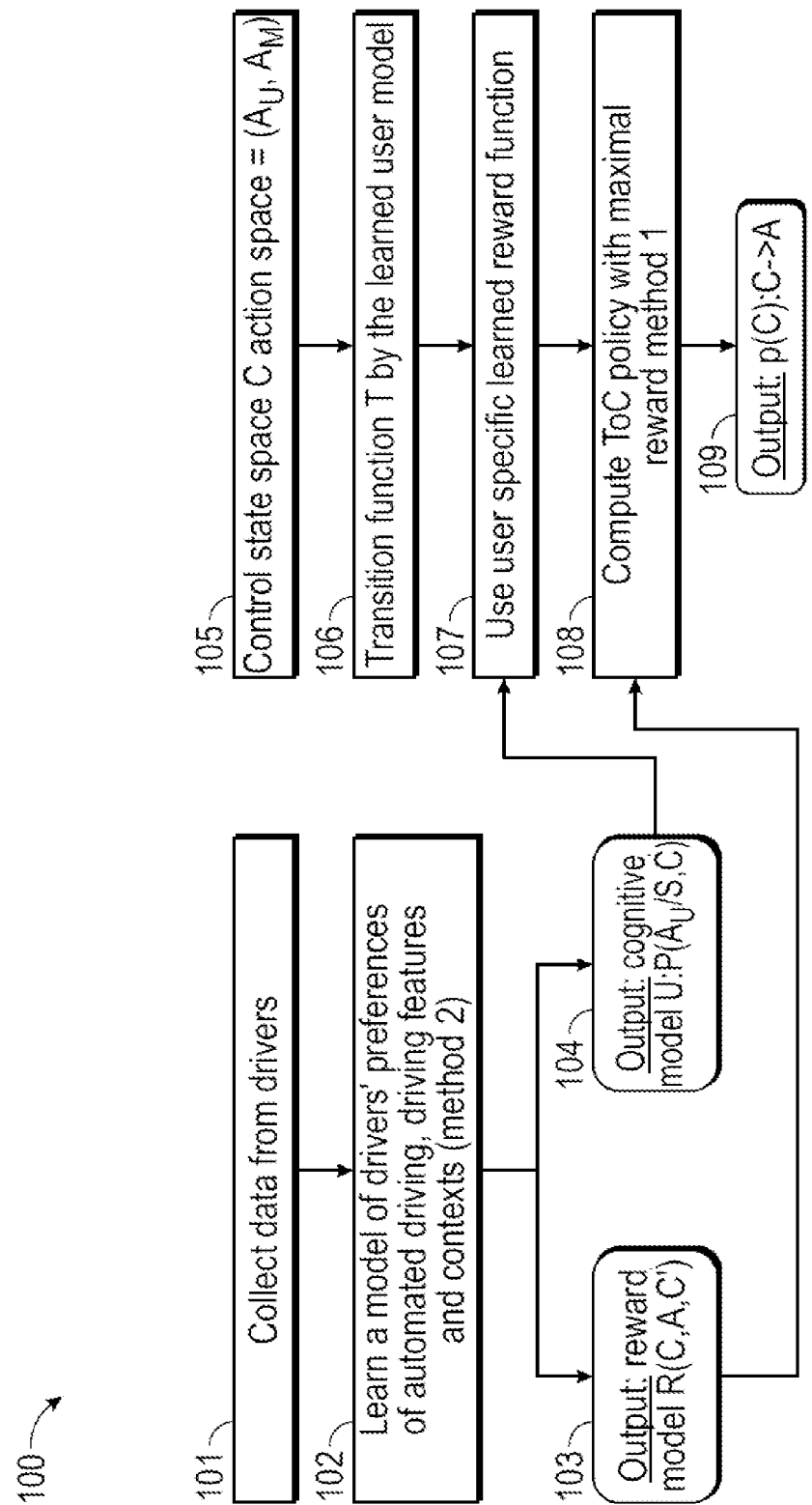
FIG. 9 is a flowchart depicting aspects of a method of acquiring a user model based on user preferences, and defining a TOC policy based on the user model, in accordance with an exemplary embodiment.

FIG. 9 depicts an embodiment of a method 100 for learning user models and defining a TOC policy. The method 100 may be part of the method 60. The method 100 is discussed in conjunction with blocks 101-109. The method 100 is not limited to the number or order of steps therein, as some steps represented by blocks 101-109 may be performed in a different order than that described below, or fewer than all of the steps may be performed.

At block 101, user preference data is collected from a user (driver). The data may be collected from a single driver, or collected from multiple drivers.

At block 102, a user model is learned that is reflective of a driver's preferences regarding certain control states. The driver's preferences are used to determine a set of vehicle features relevant for autonomous control or semi-autonomous control.

Based on the user preferences, a reward model representing the reward function R(C,A,C') is generated from user preferences (block 103). The reward function prescribes the type of notification provided to the user when an action A causes a transition from a first control state C to a second control state C', based on user preferences. In addition, a user model configured as a cognitive model is generated (block 104).

At block 105, the processing device determines the control state space (available control states, e.g., states C1-C5) and the action space including available user and machine actions. The transition function T is determined from the cognitive model (block 106), and a reward function specific to the user is calculated (block 107).

At block 108, the TOC policy having the maximal reward is calculated, for example, by a value iteration process. The result is a TOC function 7E that specifies an action a user may take when in a context state or set of context states (block 109).

Acquisition of driver preferences can be accomplished in various ways. In one embodiment, a user is prompted to provide user preferences by the vehicle system. For example, the processing device can present questionnaires asking customers to rate the importance of candidate features. The rating may be used to derive probability values. An example of such a questionnaire follows:

Questionnaire Example for driving preferences over time of day/traffic/type of road: urban, intercity, highway/occupancy/distraction:

"State your preferences for the statement A-K, by choosing a score corresponding to:
1—Do not agree at all with the statement;
2—Somewhat agree with the statement;
3—Do not care (I do not have a clear preference here);
4—Almost completely agree with the statement;
5—Completely agree with the statement."
"Statements A-K:
  A. At all times, and in all roads, I prefer to drive manually and be in control;
  B. When traffic is heavy, I prefer to drive manually and be in control;
  C. At nights, in particular, I prefer to let the car drive me automatically wherever possible;
  D. On highways, I prefer to let the car drive me automatically wherever possible;
  E. When I am alone in the car, I prefer to let the car drive me automatically wherever possible;
  F. I get very distracted when a button blinks at me requiring my intervention;
  G. Time of the day is the most important feature;
  H. Type of road is the most important feature for me deciding what I prefer;
  I. Traffic is the most important feature;
  J. Vehicle occupancy determines what is important for me;
  K. Being distracted while driving is unbearable for me."

Referring to FIG. 10, from the answers received for each statement, tables 120 and 122 are created. Table 120 provides a probability of the control state being manual given the contexts state "highway" ("H") and "night" ("N"). Table 122 is a reward function that prescribes the type of notification provided to the user, based on user preferences. The reward function in this example corresponds to a blinking light notification. As is reflected in table 122, the reward value for transitioning from control state C1 to C2 is negative, reflecting that the driver does not prefer a blinking light when the vehicle control system requests control. Maximum likelihood estimators may be used for the transition function.

The user preferences may be acquired for a single user, or if multiple users provide preference data, the probability may be based on a proportion of drivers that prefer a certain control state. For example, if a large enough number of participants have filled out the above questionnaire, the probability can be based on the proportion. If 50% of users prefer to drive automatically on the highway, then the probability Pr(highway, takeover) may be set to 0.5.

Another implementation of learning user models includes collecting data from real drivers and learning when a user or users take control actions (e.g., disengage and transferred to manual control, engage autonomous control). Predicting these user's behaviors is dependent on the context (types or roads, time of day, etc.). Such a prediction can be performed by a machine learning or artificial intelligence process, such as deep learning and/or learning classifiers.

Figure 11:
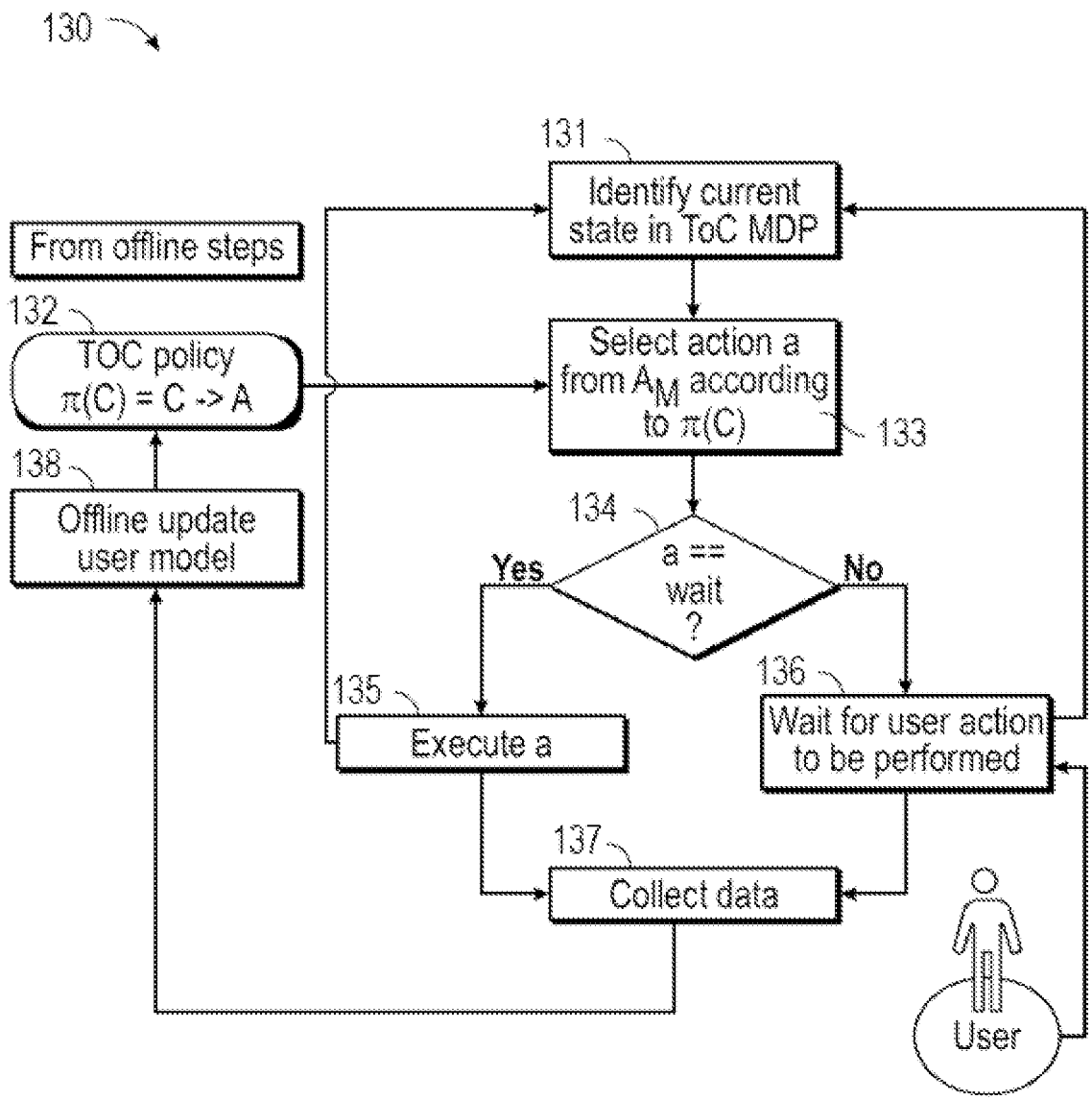
FIG. 11 is a flowchart depicting aspects of a method of controlling vehicle control states based on a TOC policy, in accordance with an exemplary embodiment.

FIG. 11 depicts an embodiment of a method 130 of performing transfers of control during vehicle operation using a TOC policy $\pi(C): C \rightarrow A$, which prescribes an action to be performed based on a current control state. At block 131, the current control state is detected and identified in the MDP framework. Using the TOC policy (block 132), a vehicle control system action Am is selected (block 133). Depending on the action, the processing device determines whether to immediately execute the action or wait for a user action to be performed (block 134). The processing device can then immediately execute the action at (block 135), or wait for an action to be performed by the user (block 136).

Interaction data can be collected at block 137, and used to update a user model (block 138). The MDP process and TOC policy are then updated based on the updated user model.

In one embodiment, the processing device is configured to collect interaction data between a user and a vehicle control system and use the interaction data to update an existing user model. Based on the updated user model, updates to the transition and reward functions are performed, as well as a re-computation of the TOC policy.

In addition to detecting user control actions and inputs for updating the user model, the collected interaction data can include data indicative of a user's emotional and/or cognitive state during vehicle operation. Inclusion of driver monitoring (DMS, emotional state) as a factor in determining probability of transfer (e.g., the likelihood that a person who has a slow gaze (due to, e.g., inebriated, inattentive, irresponsive, occupied with phone)) will take control. Driver monitoring data can be captured by the transition function in the MDP process. The actual willingness or unwillingness of a driver to take control or otherwise select a control state can also be reflected by the user model.

In one embodiment, the processing device is configured to design a TOC policy by calculating policies for two (or more) independent TOC designs, where each candidate TOC design has its own set of possible actions and transitions (for example, a first candidate policy uses a timeout of 5 seconds to cancel a control request from the vehicle, while a second candidate policy needs a button press 'cancel').

Two MDP processes are constructed to represent the candidate designs. For each MDP process, the optimal policy of transfer of control and the expected reward/value is calculated. Expected reward values are compared, and the candidate design with highest value is selected.

Note that the criteria for choosing one of the TOC MDP over the other is the cost incurred by the respective policy solutions. These costs may reflect interaction factors (like the complexity of interactions, cognitive/sensory load, number of interactions, etc.).

FIGS. 12-15 illustrate examples of the method 60 and/or 130 for various exemplary users. A user model and reward function are shown for each example. FIGS. 12 and 13 illustrate situations in which a reward value provided to a user is independent of context and dependent on interaction cost. FIGS. 14 and 15 illustrate situations in which a reward provided to a user is dependent on both context and interaction cost.

In the example of FIG. 12, "user 1" prefers manual driving over autonomous control in general, but prefers to use autonomous control sometimes. Blinking from a user interface does not both user 1 very much. These preferences are used to create a user model 140 (LUT) that indicates the probability of user 1 taking manual control. As shown, there is a high probability (0.9) that user 1 would like to take control when driving on a highway at night. The processing device in this example may automatically transition to manual control in response to user 1 taking an appropriate action (e.g., steering or applying brakes)

A reward function is represented by reward model 142, which reflects that the user does not have a strong preference against blinking lights. Thus, interaction cost to user 1 is low, and the reward model has a high reward value when the control state transitions from C4 to C1 (user takes manual control). Thus, the processing device will present a blinking light notification.

In the example of FIG. 13, "user 2" prefers autonomous control most of the time, and occasionally prefers to drive manually. Blinking from a user interface disturbs user 2. These preferences are used to create a user model 150 that indicates the probability of user 2 taking manual control. As shown, there is a low probability (0.1) that user 2 would like to take control when driving on a highway at night. The processing device in this example thus does not change control states in response to the same action performed by user 2 (e.g., moving the steering wheel or applying brakes). A reward model 152 reflects that the user does not like to be notified by blinking lights. Thus, interaction cost to user 2 is high, and the reward model has a low reward value. Thus, the processing device will not present a blinking light notification, unless other conditions are present (e.g., user 2 is distracted).

In the example of FIG. 14, the reward depends on both interaction costs and context, and is represented by a reward model 142a. The user 1 prefers manual driving over autonomous control and prefers to drive sportier at night on a highway. In this example, the reward is based on both the context (highway and night) and the user's reward preferences. The context here is weighted higher than interaction costs, and thus the reward model 142a includes a higher reward value when transitioning from C4 to C1., as compared to the example of FIG. 12.

In the example of FIG. 15, the user 2 prefers to drive manually during the day on local roads, and prefers autonomous control at night when on a highway. Again, the reward is based on both the context (highway and night) and the user's reward preferences, as represented by a reward model 152a.

Although embodiments are described herein with respect to semi-autonomous vehicles, such as passenger vehicles (e.g., cars and trucks), the embodiments are not so limited and can be applied to any transportation or other system that has autonomous or semi-autonomous functionality. Examples of such systems include semi-autonomous transportation systems (e.g., semi-autonomous vehicles, planes, trains, etc.), personal mobility vehicles (e.g. wheelchairs, walking aids, etc.), semi-autonomous rescue services having both automated (e.g., robotic) operators and human operators, and systems that feature human and automated operators (e.g., agriculture, industrial, manufacturing, personal assistants, etc.).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for facilitating transfers of control among a user and a control system, comprising:
a processor configured to acquire a set of user preferences for a user, the set of user preferences relating control states to contexts, the control states including at least a manual control state, an autonomous control state and a semi-autonomous control state, the set of user preferences including a ranking of a preference of the user to transition between the control states in a given context state, the ranking indicative of an extent of the preference, the ranking represented by a value selected from a first value indicating that the user does prefer to make the transition, a second value indicating that the user does not prefer to make the transition, and a third value indicating a partial preference for making the transition; and
the processor configured to automatically perform, during operation of a semi-autonomous system:
generating a transfer of control (TOC) policy based on the set of user preferences and a current context state, the TOC policy prescribing transitions between control states in response to actions performed during the operation, the TOC policy utilizing a user model indicating a probability that the user prefers a control state transition in a current context state, the probability based on the ranking;
based on an action performed by the user or the control system, determining based on the TOC policy whether to perform a transition from a current control state to a second control state
in response to the TOC policy prescribing the transition, transitioning from the current control state to the second control state; and
acquiring interaction data representing interactions between the user and the control system during the operation, determining one or more updates to the set of user preferences based on the interaction data, and updating the user model based on the updated preferences.

2. The system of claim 1, wherein the processor is configured to generate the user model based on the set of user preferences, the user model configured to predict a user action when the control system is operating in the current context state.

3. The system of claim 1, wherein the TOC policy is generated according to a Markov decision process (MDP).

4. The system of claim 1, wherein the processor is further configured to perform, based on the set of user preferences, estimating at least one of a cognitive load and a sensory load on the user when interacting with the control system.

5. The system of claim 4, wherein generating the TOC policy includes calculating a reward function associated with a notification presented by the control system, the reward function based on the cognitive load and/or the sensory load, the processor configured to present the notification to the user in response to a value of the reward function exceeding a selected value.

6. The system of claim 1, wherein the context states include a time of day context state, a road type context state and a road condition context state.

7. A method of facilitating transfers of control among a user and a control system, comprising:
acquiring a set of user preferences, the set of user preferences relating control states to contexts, the control states including at least a manual control state, an autonomous control state and a semi-autonomous control state, the set of user preferences including a ranking of a preference of the user to transition between the control states in a given context state, the ranking indicative of an extent of the preference, the ranking represented by a value selected from a first value indicating that the user does prefer to make the transition, a second value indicating that the user does not prefer to make the transition, and a third value indicating a partial preference for making the transition;
automatically, during operation of a semi-autonomous system, generating a transfer of control (TOC) policy based on the set of user preferences and a current context state, the TOC policy prescribing transitions between control states in response to actions performed during the operation, the TOC policy utilizing a user model indicating a probability that the user prefers a control state transition in a current context state, the probability based on the ranking;
based on an action performed by the user or the control system, determining based on the TOC policy whether to perform a transition from a current control state to a second control state;
in response to the TOC policy prescribing the transition, transitioning from the current control state to the second control state; and
acquiring interaction data representing interactions between the user and the control system during the operation, determining one or more updates to the user preferences based on the interaction data, and updating the user model based on the updated preferences.

8. The method of claim 7, wherein the user model is configured to predict a user action when the control system is operating in the current context state.

9. The method of claim 7, wherein the TOC policy is generated according to a Markov decision process (MDP).

10. The method of claim 7, further comprising, based on the set of user preferences, estimating at least one of a cognitive load and a sensory load on the user when interacting with the control system.

11. The method of claim 10, wherein generating the TOC policy includes calculating a reward function associated with a notification presented by the control system, the reward function based on the cognitive load and/or the sensory load.

12. The method of claim 7, wherein the context states include a time of day context state, a road type context state and a road condition context state.

13. A vehicle control system comprising:
a memory having computer readable instructions; and
a processor for executing the computer readable instructions, the computer readable instructions controlling the processor to perform:
acquiring a set of user preferences, the set of user preferences relating control states to vehicle contexts, the control states including at least a manual control state, an autonomous control state and a semi-autonomous control state, the set of user preferences including a ranking of a preference of the user to transition between the control states in a given context state, the ranking indicative of an extent of the preference, the ranking represented by a value selected from a first value indicating that the user does prefer to make the transition, a second value indicating that the user does not prefer to make the transition, and a third value indicating a partial preference for making the transition;
automatically, during operation of a vehicle by a user, generating a transfer of control (TOC) policy based on the set of user preferences and a current context state, the TOC policy prescribing transitions between control states in response to actions performed during the vehicle operation, the TOC policy utilizing a user model indicating a probability that the user prefers a control state transition in a current context state, the probability based on the ranking;
based on an action performed by the user or a vehicle control system, determining, based on the TOC policy, whether to perform a transition from a current control state to a second control state;
in response to the TOC policy prescribing the transition, transitioning from the current control state to the second control state; and
acquiring interaction data representing interactions between the user and the control system during the operation, determining one or more updates to the user preferences based on the interaction data, and updating the user model based on the updated preferences.

14. The vehicle control system of claim 13, wherein the user model is configured to predict a user action when the vehicle is in the current context state.

15. The vehicle control system of claim 13, wherein the TOC policy is generated according to a Markov decision process (MDP).

16. The vehicle control system of claim 13, wherein the processor is further configured to perform, based on the set of user preferences, estimating at least one of a cognitive load and a sensory load on a user when interacting with the vehicle control system.

17. The vehicle control system of claim 16, wherein generating the TOC policy includes calculating a reward function associated with a notification presented by the vehicle control system, the reward function based on the cognitive load and/or the sensory load.

18. The vehicle control system of claim 13, wherein the context states include a time of day context state, a road type context state and a road condition context state.

* * * * *